(12) United States Patent
Imano et al.

(10) Patent No.: US 9,541,281 B2
(45) Date of Patent: Jan. 10, 2017

(54) HIGH-TEMPERATURE PIPING PRODUCT AND METHOD FOR PRODUCING SAME

(71) Applicant: Hitachi, Ltd., Tokyo (JP)

(72) Inventors: Shinya Imano, Hitachi (JP); Hiroyuki Doi, Tokai-mura (JP); Jun Sato, Yasugi (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 808 days.

(21) Appl. No.: 13/858,282

(22) Filed: Apr. 8, 2013

(65) Prior Publication Data

US 2013/0263796 A1 Oct. 10, 2013

(30) Foreign Application Priority Data

Apr. 10, 2012 (JP) ................................ 2012-089056

(51) Int. Cl.
*F22B 37/04* (2006.01)
*F16L 9/02* (2006.01)
(Continued)

(52) U.S. Cl.
CPC .............. *F22B 37/04* (2013.01); *B23K 9/0282* (2013.01); *B23K 9/167* (2013.01); *B23K 9/23* (2013.01); *B23K 31/027* (2013.01); *B23K 35/0261* (2013.01); *B23K 35/304* (2013.01); *B23K 35/3033* (2013.01); *B23K 35/40* (2013.01); *B32B 1/08* (2013.01); *B32B 15/01* (2013.01); *B32B 15/043* (2013.01); *C21D 6/02* (2013.01);
(Continued)

(58) Field of Classification Search
CPC .......... B32B 1/08; B32B 15/01; B32B 15/043; C22C 19/055; C22C 19/03; C22C 19/05; C22C 19/051; C22C 19/056; Y10T 428/12944; Y10T 428/13; Y10T 428/12931
See application file for complete search history.

(56) References Cited

U.S. PATENT DOCUMENTS

2007/0221705 A1 9/2007 Arnett et al.
2009/0104040 A1 4/2009 Imano et al.
(Continued)

FOREIGN PATENT DOCUMENTS

EP 2172299 A2 4/2010
EP 2298946 A2 3/2011
(Continued)

*Primary Examiner* — Michael E La Villa
(74) *Attorney, Agent, or Firm* — Volpe and Koenig, P.C.

(57) ABSTRACT

A high-temperature piping product is configured from a plurality of primary pipe members and a welding material. The primary pipe members are each made from an Ni-based forged alloy containing: Ni, Al, and at least one of Mo and W. The total content of the Mo and the W being 3-8 mass %. The Ni-based forged alloy exhibiting a γ'-phase dissolution temperature of from 920 to 970° C., and the γ' phase being precipitated in 30 volume % or more in a temperature range of from 700 to 800° C. The welding material is made from an Ni-based cast alloy having a cast structure formed by welding. The Ni-based cast alloy containing: Ni, Al, and at least one of Mo and W, the total content of the Mo and the W being 9-15 mass %, the Ni-based cast alloy exhibiting a γ'-phase dissolution temperature of from 850 to 900° C.

8 Claims, 3 Drawing Sheets

(51) Int. Cl.

| | | |
|---|---|---|
| *B23K 31/02* | (2006.01) | |
| *B32B 1/08* | (2006.01) | |
| *B32B 15/01* | (2006.01) | |
| *C22C 19/05* | (2006.01) | |
| *C22C 19/03* | (2006.01) | |
| *B32B 15/04* | (2006.01) | |
| *C22F 1/10* | (2006.01) | |
| *F22B 37/10* | (2006.01) | |
| *B23K 35/30* | (2006.01) | |
| *B23K 35/40* | (2006.01) | |
| *B23K 35/02* | (2006.01) | |
| *B23K 9/028* | (2006.01) | |
| *B23K 9/167* | (2006.01) | |
| *B23K 9/23* | (2006.01) | |
| *C21D 6/02* | (2006.01) | |
| *C21D 8/10* | (2006.01) | |
| *C21D 9/08* | (2006.01) | |
| *F16L 13/02* | (2006.01) | |
| *C21D 6/00* | (2006.01) | |

(52) U.S. Cl.
CPC . *C21D 8/10* (2013.01); *C21D 9/08* (2013.01); *C22C 19/03* (2013.01); *C22C 19/05* (2013.01); *C22C 19/051* (2013.01); *C22C 19/055* (2013.01); *C22C 19/056* (2013.01); *C22F 1/10* (2013.01); *F16L 9/02* (2013.01); *F16L 13/02* (2013.01); *F22B 37/10* (2013.01); *B23K 2201/06* (2013.01); *B23K 2201/10* (2013.01); *B23K 2203/08* (2013.01); *C21D 6/001* (2013.01); *C21D 2251/04* (2013.01); *Y10T 428/12931* (2015.01); *Y10T 428/12944* (2015.01); *Y10T 428/13* (2015.01)

(56) References Cited

U.S. PATENT DOCUMENTS

| | | | | |
|---|---|---|---|---|
| 2010/0059146 | A1* | 3/2010 | Sato | B23K 35/004 |
| | | | | 148/530 |
| 2010/0158681 | A1* | 6/2010 | Nemoto | C22C 19/055 |
| | | | | 415/200 |
| 2010/0226814 | A1 | 9/2010 | Uehara et al. | |
| 2011/0058978 | A1* | 3/2011 | Sato | C22C 19/055 |
| | | | | 420/450 |

FOREIGN PATENT DOCUMENTS

| | | |
|---|---|---|
| JP | 2007-253238 A | 10/2007 |
| JP | 2009-097052 A | 5/2009 |
| JP | 2010-065547 A | 3/2010 |
| JP | 2011-052308 A | 3/2011 |
| WO | 2009028671 A1 | 3/2009 |

* cited by examiner

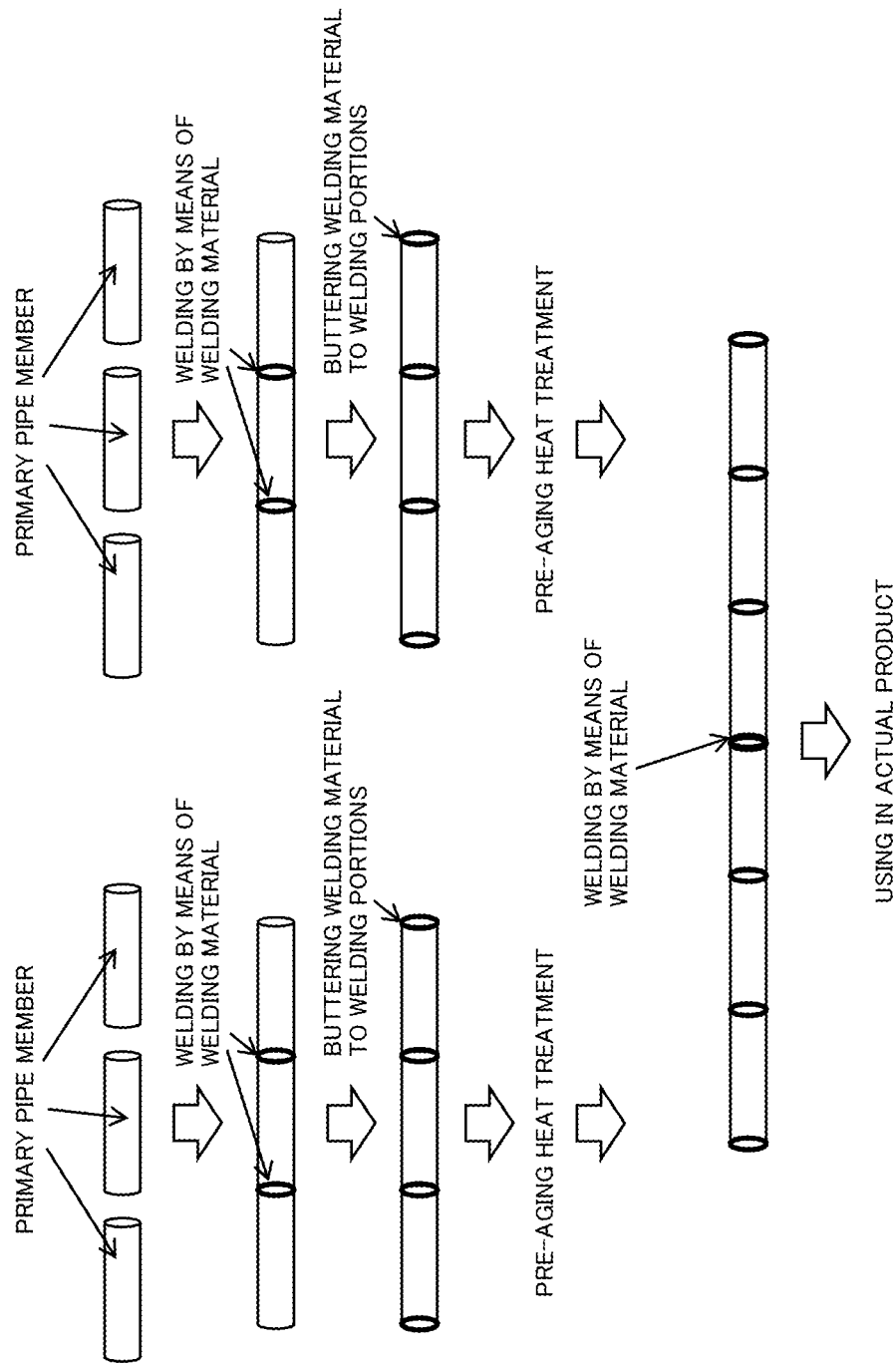

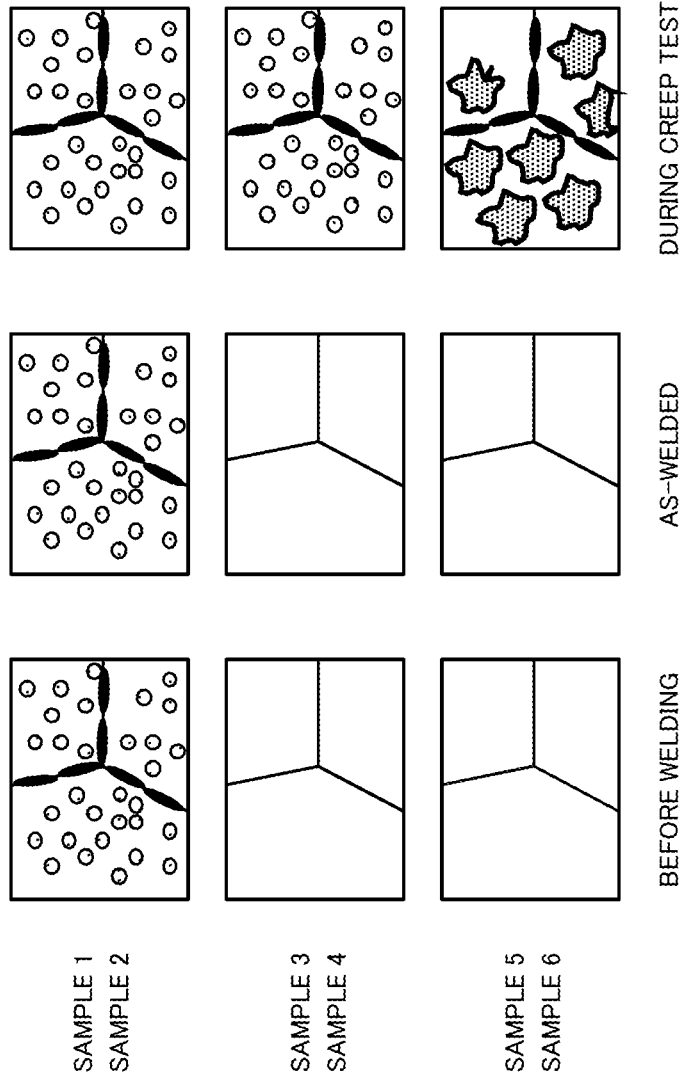

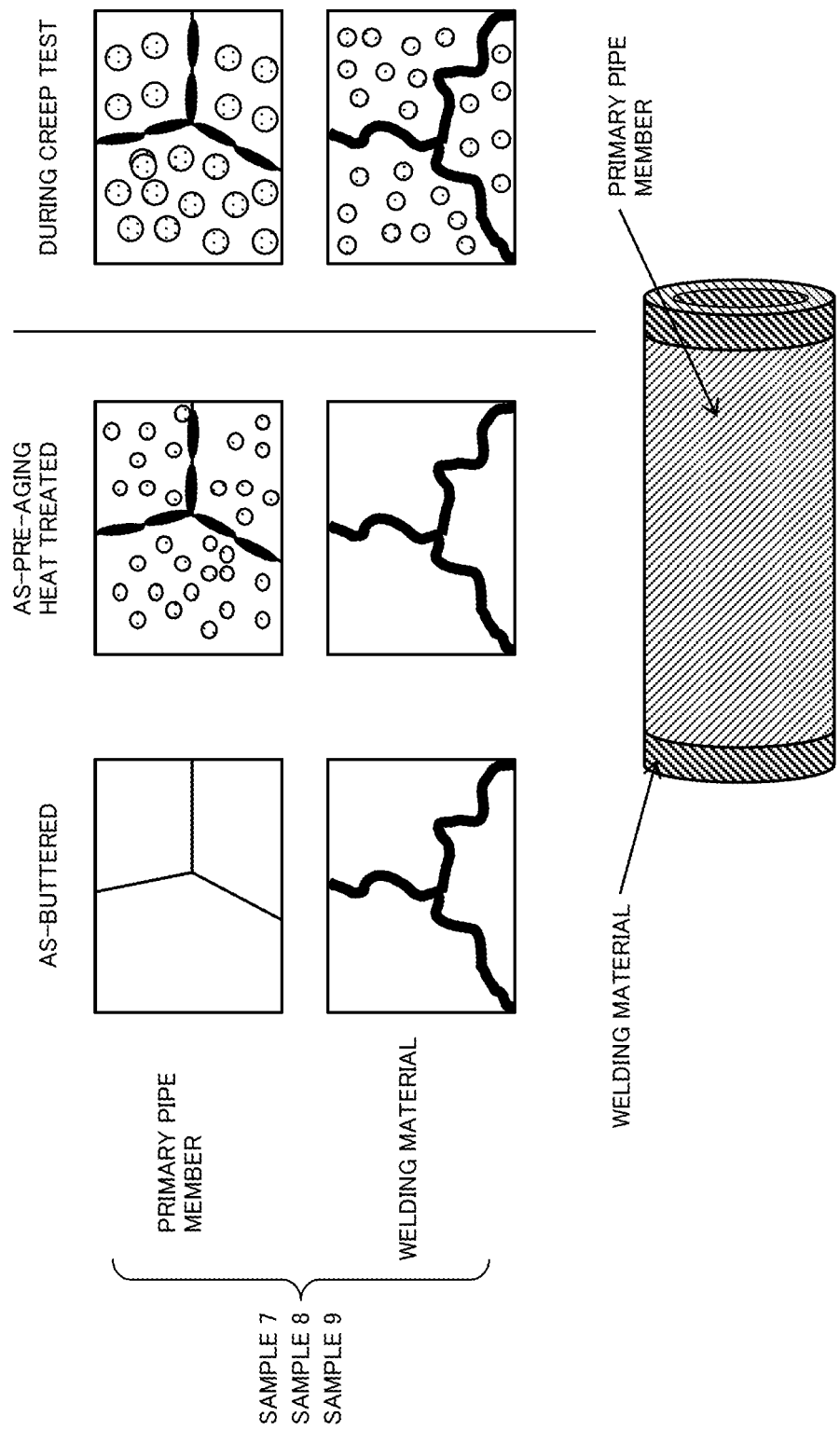

HIGH-TEMPERATURE PIPING PRODUCT AND METHOD FOR PRODUCING SAME

CLAIM OF PRIORITY

The present application claims priority from Japanese patent application serial no. 2012-089056 filed on Apr. 10, 2012, the content of which is hereby incorporated by reference into this application.

BACKGROUND OF THE INVENTION

1. Field of the Invention

The present invention relates to high-temperature piping products for power plants, particularly to high-temperature piping products used in coal-fired power plants and gas turbine power plants, and methods for producing such piping products.

2. Description of Related Art

In order to improve the power generating efficiency of power plants such as coal-fired power plants and gas turbine power plants, it is effective to increase the main steam temperature of a boiler and the combustion temperature of a gas turbine. In this connection, piping products with higher tolerable temperature are needed to further increase the main steam temperature or the combustion temperature.

For example, coal-fired power plants using a steam turbine include large scale high-temperature piping products for the boiler. Such large scale high-temperature piping products are assembled usually by welding short pipe members. In the power plants which produce a main steam of a temperature of around 700° C., an Ni-based alloy precipitation-strengthened with γ' phase ($Ni_3Al$ phase) is used as a material of the high-temperature piping products.

In an Ni-based alloy, it is indispensable that the γ' phase is evenly dispersed and precipitated in a matrix phase by heat treatment to attain high mechanical strength at a high-temperature. On the other hand, precipitation of the γ' phase is detrimental to weldability, and makes the welding difficult. It is accordingly desirable to perform the heat treatment after the welding. A problem, however, is that, because the welded and assembled high-temperature piping product is a large structure, it is very difficult after assembling to conduct a heat treatment precipitating the γ' phase (an aging heat treatment, so called) to the whole piping product.

As a countermeasure, WO2009/028671 reports a technique whereby boiler components are welded and assembled without precipitating the γ' phase, and the γ' phase is evenly dispersed and precipitated in the matrix phase of the boiler component by heat generated through a power plant operation. More specifically, the publication describes a low-thermal-expansion Ni-based super-heat-resistant alloy preferred for use as a boiler component material. The alloy contains, in mass %, C of 0.2% or less, Si of 0.5% or less, Mn of 0.5% or less, Cr of 10 to 24%, one of or both of Mo and W in amounts specified by the equation of "Mo+0.5 W=5 to 17%", Al of 0.5 to 2.0%, Ti of 1.0 to 3.0%, Fe of 10% or less, and one of or both of B (0.02% or less; excluding 0%) and Zr (0.2% or less; excluding 0%), with the remainder being Ni and unavoidable impurities. The alloy has a Vickers hardness of 240 or less.

The assumed operating temperature of the Ni-based alloy (or the boiler component) described in WO2009/028671 ranges from 700 to 750° C. (700° C. class), and the precipitation amount of the γ' phase is about 20%. In response to the recent strong demand for further improvement of the power generating efficiency of power plants, there have been studies directed to increasing the main steam temperature or combustion temperature to above 750° C. and as high as about 800° C. (800° C. class). In order to increase the tolerable temperature of the high-temperature piping product in the power plant to temperatures of the 800° C. class, there is required a γ'-phase precipitation amount of 30% or more in the material Ni-based alloy.

In one known method of attaining a γ'-phase precipitation amount of 30% or more to obtain an effective high-temperature strength for the Ni-based alloy, for example, a heat treatment is performed at 900° C. or more to precipitate about 10% of the γ' phase, followed by an aging heat treatment at 700 to 800° C. However, as described above, it is difficult to perform such a series of heat treatments for the welded and assembled high-temperature piping product. Furthermore, it is revealed through studies conducted by the present inventors that it is difficult to ensure the required high-temperature strength characteristics by the direct application of the Ni-based alloy described in WO2009/028671. (This will be described later in greater detail.)

SUMMARY OF THE INVENTION

In view of the foregoing, it is an objective of the present invention to solve the above-described problems, and to provide high-temperature piping products exhibiting a tolerable temperature of the 800° C. class, and a method for producing such high-temperature piping products. The present invention also provides a boiler for power plants of the 800° C. class equipped with the high-temperature piping product.

(I) According to an aspect of the present invention, there is provided a high-temperature piping product for flowing a high-temperature fluid, configured from a plurality of primary pipe members and a welding material, wherein the primary pipe members are each made from an Ni (nickel)-based forged alloy which contains Ni, Al (aluminum), and at least one of Mo (molybdenum) and W (tungsten), the total content of the Mo and the W being 3 mass % or more and 8 mass % or less, the Ni-based forged alloy having a γ' (gamma prime)-phase dissolution temperature of from 920 to 970° C., and a γ' phase being precipitated in the Ni-based forged alloy in 30 volume % or more in a temperature range of from 700 to 800° C., wherein the welding material is made from an Ni-based cast alloy having a cast structure formed by welding, the Ni-based cast alloy containing Ni, Al, and at least one of Mo and W, the total content of the Mo and the W being 9 mass % or more and 15 mass % or less, the Ni-based cast alloy having a γ'-phase dissolution temperature of from 850 to 900° C., a γ' phase being precipitated in the Ni-based cast alloy in 20 volume % or more in a temperature range of from 700 and 800° C., and wherein the welding material is buttered to the primary pipe members in portions to be welded to each other.

In the present invention, the γ' phase means an $Ni_3Al$ intermetallic compound phase having an L12 structure, and encompasses compounds in which the Al site is partially substituted with other elements. The process leading to the production of the Ni-based cast alloy is not limited, as long as the final structure is a cast structure.

In the above aspect (I) of the invention, the following modifications and changes can be made.

(i) The Ni-based forged alloy contains: Al of 3.5 mass % or more and 4.5 mass % or less; Cr (chromium) of 15 mass % or more and 20 mass % or less; Co (cobalt) of 25 mass % or less; C (carbon) of 0.01 mass % or more and 0.15 mass % or less; at least one of Mo and W in a total content of 3 mass % to 8 mass %; and Ni and unavoidable impurities accounting for the remainder. Furthermore, the Ni-based cast alloy contains: Al of 3 mass % or more and 3.5 mass % or less; Cr of 15 mass % or more and 20 mass % or less; Co of 25 mass % or less; C of 0.01 mass % or more and 0.15 mass % or less; at least one of Mo and W in a total content of 9 mass % to 15 mass %; and Ni and unavoidable impurities accounting for the reminder.

(II) According to another aspect of the present invention, there is provided a method for producing the above-described high-temperature piping product, the method including:

a secondary pipe member forming step of welding the primary pipe members to each other with the welding material buttered to welding portions of the primary pipe members and forming secondary pipe members each constructed from the plurality of primary pipe members; and a high-temperature piping product forming step of welding the secondary pipe members to each other with the welding material buttered to welding portions of the secondary pipe members and forming a high-temperature piping product.

In the above aspect (II) of the invention, the following modifications and changes can be made.

(ii) The method further includes a pre-aging heat treatment step of subjecting the secondary pipe members to a heat treatment at a temperature equal to or greater than the γ'-phase dissolution temperature of the Ni-based cast alloy and at a temperature equal to or less than the γ'-phase dissolution temperature of the Ni-based forged alloy to precipitate 5 volume % or more and 15 volume % or less of the γ' phase in the primary pipe members, the pre-aging heat treatment step being performed after the secondary pipe member forming step and before the high-temperature piping product forming step.

(iii) The high-temperature piping product forming step is not followed by an aging heat treatment in which 30 volume % or more of the γ' phase is precipitated in the primary pipe members under external heat applied to the whole of the high-temperature piping product.

(III) According to still another aspect of the present invention, there is provided a boiler for power plants, the boiler including the above-described high-temperature piping product.

ADVANTAGES OF THE INVENTION

According to the present invention, it is possible to provide a high-temperature piping product exhibiting a tolerable temperature of the 800° C. class, and to provide a method for producing such high-temperature piping products. The present invention can also provide a boiler for power plants of the 800° C. class with the use of the high-temperature piping product.

BRIEF DESCRIPTION OF THE DRAWINGS

FIG. 1 is a schematic view representing an exemplary procedure of producing a high-temperature piping product according to an embodiment of the present invention.

FIG. 2 is a schematic view showing microstructures of weld joints of Samples 1 to 6.

FIG. 3 is a schematic view showing microstructures of weld joints of Samples 7 to 9.

DETAILED DESCRIPTION OF THE PREFERRED EMBODIMENTS

An embodiment of the present invention will be described below. However, the present invention is not limited to the specific embodiments described below, but various combinations and modifications are possible without departing from the spirit and scope of the invention.

(High-Temperature Piping Product)

As described above, the high-temperature piping product according to an embodiment of the present invention is a structure formed by welding and assembling relatively short primary pipe members with a welding material. And the Ni-based forged alloy forming the primary pipe member, and the Ni-based cast alloy forming the welding material have different γ'-phase dissolution temperatures ("γ'-phase dissolution temperature of the Ni-based forged alloy">"γ'-phase dissolution temperature of the Ni-based cast alloy"). The welding portions of the primary pipe members represent a weld joint buttered with the welding material.

In order to ensure desirable weldability and desirable tolerable temperature of the 800° C. class (sufficient mechanical strength in this temperature range), the primary pipe member is preferably made from an Ni-based forged alloy that exhibits a γ' phase ($Ni_3Al$ phase) dissolution temperature of from 920 to 970° C., and in which 30 volume % or more and 40 volume % or less (30-40 volume %) of the γ' phase is dispersed and precipitated in a temperature range of from 700 to 800° C. A sufficient tolerable temperature cannot be obtained when the amount of the γ' phase dispersed and precipitated in the 700 to 800° C. temperature range is less than 30 volume %, and the ductility degrades greatly when the amount of the dispersed and precipitated γ' phase is above 40 volume %.

Furthermore, when the γ'-phase dissolution temperature of the Ni-based forged alloy is less than 920° C., it becomes difficult to obtain the high-temperature piping product exhibiting a tolerable temperature of the 800° C. class by means of the producing method according to an embodiment of the present invention (details will be described later). With a γ'-phase dissolution temperature in excess of 970° C., the weldability of the primary pipe member degrades, and the hot workability suffers (the ductility degrades), making it difficult to produce the pipe member itself.

Preferably, the Ni-based forged alloy has a composition containing: Al of 3.5 mass % or more and 4.5 mass % or less (3.5-4.5 mass %); Cr of 15 mass % or more and 20 mass % or less (15-20 mass %); Co of 25 mass % or less; C of 0.01 mass % or more and 0.15 mass % or less (0.01-0.15 mass %); at least one of Mo and W in a total content of 3 mass % to 8 mass %; and Ni and unavoidable impurities accounting for the remainder.

The Mo component and the W component are constituent elements that have strong effects on the precipitation amount and the dissolution temperature of the γ' phase, and on the hot workability of the Ni-based alloy. A sufficient tolerable temperature cannot be obtained when the total content of the Mo component and the W component is less than 3 mass %. Above 8 mass %, the hot workability suffers (the ductility degrades), making it difficult to produce the pipe member itself.

The Al component is an essential component for forming the γ' phase. With an Al component content less than 3.5 mass %, the γ'-phase precipitation amount becomes deficient, and a sufficient tolerable temperature cannot be obtained. Above 4.5 mass %, the hot workability suffers (the ductility degrades), making it difficult to produce the pipe member itself.

The Cr component dissolves in the matrix, and has the effect of improving the oxidation resistance of the Ni-based alloy. This effect is hardly obtained when the content of the Cr component is less than 15 mass %. Above 20 mass %, a harmful phase is prone to precipitate, and the ductility degrades, making it difficult to produce the pipe member itself.

The Co component dissolves in the matrix, and has the effect of improving the high-temperature mechanical strength by formation of a solid solution. However, the Co component is added in preferably 25 mass % or less, because it also acts to stabilize the harmful phase.

The C component has the effect of preventing the excess coarsening of the Ni-based alloy crystal grains through formation of carbides. This effect is hardly obtained when the content of the C component is less than 0.01 mass %. Above 0.15 mass %, the hot workability suffers (the ductility degrades), making it difficult to produce the pipe member itself. For improved weldability, the content of the C component is preferably 0.01 mass % to 0.05 mass %.

On the other hand, the welding material differs from the primary pipe member in that it is used in the state of a solidification structure, and that it is not subjected to plastic forming (for example, not processed into a tubular shape). Preferably, the welding material is made from an Ni-based cast alloy that exhibits a $\gamma'$ phase ($Ni_3Al$ phase) dissolution temperature of from 850 to 900° C., and in which 20 volume % or more and 30 volume % or less (20-30 volume %) of the $\gamma'$ phase is dispersed and precipitated in a temperature range of from 700 to 800° C. A sufficient tolerable temperature cannot be obtained when the amount of the $\gamma'$ phase dispersed and precipitated in the 700 to 800° C. temperature range is less than 20 volume %. Above 30 volume %, weld cracking is prone to occur.

Furthermore, when the $\gamma'$-phase dissolution temperature of the Ni-based cast alloy is less than 850° C., it becomes difficult to obtain the high-temperature piping product exhibiting a tolerable temperature of the 800° C. class by means of the producing method according to an embodiment of the present invention (details will be described later). With a $\gamma'$-phase dissolution temperature in excess of 900° C., the buttering weldability degrades.

Preferably, the Ni-based cast alloy has a composition that contains: Al of 3 mass % or more and 3.5 mass % or less (3-3.5 mass %); Cr of 15 mass % or more and 20 mass % or less (15-20 mass %); Co of 25 mass % or less; C of 0.01 mass % or more and 0.15 mass % or less (0.01-0.15 mass %); at least one of Mo and W in a total content of 9 mass % to 15 mass %; and Ni and unavoidable impurities accounting for the remainder.

As described above, the Mo component and the W component are constituent elements that have strong effects on the precipitation amount and the dissolution temperature of the $\gamma'$ phase, and on the hot workability of the Ni-based alloy. However, because the welding material does not require plastic forming, the Mo component and the W component can be added in larger amounts than in the primary pipe member to ensure high mechanical strength at high-temperatures. A sufficient high-temperature mechanical strength cannot be obtained when the total content of the Mo component and the W component is less than 9 mass %. Above 15 mass %, the ductility, and the processibility of a weld wire suffer.

The content of the Al component in the Ni-based cast alloy for the welding material ranges from 3 to 3.5 mass %. The mechanical strength becomes insufficient when the Al component content is below 3 mass %. Above 3.5 mass %, the wire processibility and weldability become insufficient. The Cr component, the Co component, and the C component are same as in the primary pipe member.

Desirably, the Ni-based forged alloy and the Ni-based cast alloy used in the present invention do not contain a Ti (titanium) component, a Ta (tantalum) component, and an Nb (niobium) component. In other words, these components are not intentionally added. When mixed unintentionally, the total content of the Ti component, the Ta component, and the Nb component is preferably 0.5 mass % or less.

Ti, Ta, and Nb have the characteristics of more strongly stabilizing the $\gamma'$ phase at temperatures of 1,000° C. and higher, compared to Al. However, the effect of stabilizing the $\gamma'$ phase is weaker than that of Al at operating temperatures (700 to 800° C.). It is difficult to obtain desirable hot workability and desirable weldability of the Ni-based alloy when the $\gamma'$ phase is stable at temperatures of 1,000° C. and higher. It is therefore more preferable to stabilize the $\gamma'$ phase with Al alone, without adding Ti, Ta, and Nb, in order to realize good hot workability and weldability at the same time as the mechanical strength at operating temperatures.

(Method for Producing High-Temperature Piping Product)

The method for producing a high-temperature piping product according to an embodiment of the present invention will be described below. First, the primary pipe member of the Ni-based forged alloy, and the welding material of the Ni-based cast alloy are prepared. The primary pipe member is subjected to a heat treatment (solution heat treatment) at a temperature equal to or greater than the $\gamma'$-phase dissolution temperature to dissolve the $\gamma'$ phase in the matrix.

FIG. 1 is a schematic view representing an exemplary procedure of producing the high-temperature piping product according to the embodiment of the present invention. As shown in FIG. 1, the primary pipe members are welded to each other with the welding material buttered to the welding portions of the primary pipe members to form a secondary pipe member constructed from the plurality of primary pipe members (this step is referred to as secondary pipe member forming step).

The secondary pipe member is then subjected to a heat treatment at a temperature equal to or greater than the $\gamma'$-phase dissolution temperature of the Ni-based cast alloy of the welding material and a temperature equal to or less than the $\gamma'$-phase dissolution temperature of the Ni-based forged alloy of the primary pipe member (specifically, at a temperature of, for example, above 900° C. and below 920° C.) to precipitate 5 volume % or more and 15 volume % or less (for example, 10 volume %) of the $\gamma'$ phase in the primary pipe members (this step is referred to as pre-aging heat treatment step).

Prior to the pre-aging heat treatment step, the welding material may be buttered to the welding portions of the secondary pipe members (see FIG. 1). Precipitation of the $\gamma'$ phase in the primary pipe member lowers the weldability of the primary pipe member itself. However, because the aging heat treatment temperature is equal to or greater than the $\gamma'$-phase dissolution temperature of the buttered welding material, the $\gamma'$ phase does not precipitate in the welding material. This provides desirable weldability for the next step.

Thereafter, the welding material is buttered to the welding portions of the secondary pipe members to weld the secondary pipe members to each other and form a high-temperature piping product (this step is referred to as high-temperature piping product forming step). As described above, the welding material may be buttered to the welding portions of the secondary pipe members before or after the pre-aging heat treatment step.

The high-temperature piping product obtained after the high-temperature piping product forming step is directly used for the assembly of the actual product (for example, a boiler for power plants of the 800° C. class). The γ' phase evenly disperses and precipitates in 30 volume % or more in the primary pipe members as a high-temperature fluid of the 800° C. class is flown during the operation of the power plant, and high mechanical strength at high-temperatures can be ensured. In other words, in the producing method according to the embodiment of the present invention, the high-temperature piping product forming step is not followed by the aging heat treatment performed to precipitate 30 volume % or more of the γ' phase in the primary pipe members under the external heat applied to the whole high-temperature piping product.

Examples

The present invention will be described in more detail below by way of Examples. It should be noted, however, that the present invention is not limited by the specific Examples below.

(Preparation of Primary Pipe Member and Welding Material)

Ni-based alloys (Alloys T1 to T5) of the compositions presented in Table 1 were prepared, and specimens of the primary pipe members were produced according to the following procedures. First, an Ni-based alloy ingot was produced by vacuum melting and vacuum arc remelting (double melting process). The Ni-based alloy ingot was subjected to hot forging to produce a billet. Then, hot extrusion and cold working were performed for the billet to produce a primary pipe member (inner diameter of 50 mm; thickness of 8 mm) that simulates a boiler tube for power plants. The resulting primary pipe members (Alloys T1 to T5) were examined with respect to the γ'-phase dissolution temperature, and the γ'-phase precipitation amount in the aging heat treatment (800° C.). The results are presented in Table 1. Alloys T1 and T2 are conventional Ni-based alloys, and Alloys T3 to T5 represent the Ni-based alloys according to the present invention.

TABLE 1

Compositions of Ni-based alloys for primary pipe member

|  | Alloy T1 | Alloy T2 | Alloy T3 | Alloy T4 | Alloy T5 |
|---|---|---|---|---|---|
| Al | 1.9 | 5.4 | 4.0 | 4.2 | 3.7 |
| Cr | 23.2 | 8.3 | 15 | 16 | 17 |
| Co | 18.7 | 9.2 | 24 | 15 | 0 |
| C | 0.14 | 0.08 | 0.01 | 0.03 | 0.05 |
| Mo | — | 0.49 | — | 4.0 | 0.1 |
| W | 2.1 | 9.4 | 6.0 | 3.0 | 8.0 |
| Ti | 3.8 | 0.8 | — | — | — |
| Ta | 1.38 | 3.19 | — | — | — |
| Nb | 1.0 | — | — | — | — |
| γ'-phase dissolution temperature | 930° C. | 940° C. | 930° C. | 945° C. | 915° C. |
| γ'-phase precipitation amount | 20% | 18% | 33% | 35% | 30% |

Ni-based alloys (Alloys W1 to W5) of the compositions presented in Table 2 were prepared, and specimens of the welding materials were produced according to the following procedures. First, an Ni-based alloy ingot was produced by vacuum melting. The Ni-based alloy ingot was then subjected to hot forging and cold drawing to produce a welding material (a weld wire with an outer diameter of 1 mm). The resulting welding materials (Alloys W1 to W5) were examined with respect to the γ'-phase dissolution temperature, and the γ'-phase precipitation amount in the aging heat treatment (800° C.). The results are presented in Table 2. Alloys W1 and W2 are conventional Ni-based alloys, and Alloys W3 to W5 represent the Ni-based alloys according to the present invention.

TABLE 2

Compositions of Ni-based alloys for welding material

|  | Alloy W1 | Alloy W2 | Alloy W3 | Alloy W4 | Alloy W5 |
|---|---|---|---|---|---|
| Al | 1.9 | 5.4 | 3.1 | 3.3 | 3.5 |
| Cr | 23.2 | 8.3 | 15 | 16 | 17 |
| Co | 18.7 | 9.2 | 24 | 15 | 0 |
| C | 0.14 | 0.08 | 0.01 | 0.03 | 0.05 |
| Mo | — | 0.49 | 8.0 | 10 | 9.0 |
| W | 2.1 | 9.4 | 6.0 | 3.0 | 8.0 |
| Ti | 3.8 | 0.8 | — | — | — |
| Ta | 1.38 | 3.19 | — | — | — |
| Nb | 1.0 | — | — | — | — |
| γ'-phase dissolution temperature | 930° C. | 940° C. | 860° C. | 870° C. | 880° C. |
| γ'-phase precipitation amount | 20% | 18% | 20% | 20% | 22% |

(Production of Weld Joint, and Testing and Evaluation of Weld Joint) The primary pipe members and the welding materials prepared as above were used in a TIG (tungsten inert gas) welding performed in the combinations and conditions presented in Tables 3 and 4 to produce weld joints (Samples 1 to 9) as the secondary pipe members. The weld joints (Samples 1 to 9) were then subjected to microstructure observation of a sample cross section (including an evaluation of the presence or absence of weld cracking), and a creep test. The microstructure observation was also performed to unwelded samples and to samples taken out in the middle of the creep test (creep test suspended specimens). The creep test was conducted at a temperature of 800° C. under 190 MPa stress. The result of the creep test was used for the evaluation of a creep tolerable temperature according to the Larson-Miller method (Larson-Miller parameter=20). The creep tolerable temperature is the temperature at which the product can withstand a 100-MPa stress for 100,000 hours. The evaluation results for the presence or absence of weld cracking, and the creep tolerable temperature are presented in Tables 3 and 4.

TABLE 3

Specifications of weld joints of Samples 1 to 6 and testing and evaluation results

|  | Sample 1 | Sample 2 | Sample 3 | Sample 4 | Sample 5 | Sample 6 |
|---|---|---|---|---|---|---|
| Primary pipe member | Alloy T2 | Alloy T1 | Alloy T2 | Alloy T1 | Alloy T3 | Alloy T5 |
| Welding material | Alloy W2 | Alloy W1 | Alloy W2 | Alloy W2 | Alloy W5 | Alloy W3 |
| Buttering | — | — | — | — | — | — |

TABLE 3-continued

Specifications of weld joints of Samples
1 to 6 and testing and evaluation results

|  | Sample 1 | Sample 2 | Sample 3 | Sample 4 | Sample 5 | Sample 6 |
|---|---|---|---|---|---|---|
| material |  |  |  |  |  |  |
| Solution heat treatment | 1,160° C. × 2 h | | 1,160° C. × 2 h | | 1,160° C. × 2 h | |
| Pre-aging heat treatment | 800° C. × 16 h | | — | | — | |
| Weld cracking | Present | Present | Absent | Absent | Absent | Absent |
| Creep tolerable temperature | 733° C. | 728° C. | 742° C. | 738° C. | 770° C. | 772° C. |

TABLE 4

Specifications of weld joints of Samples
7 to 9 and testing and evaluation results

|  | Sample 7 | Sample 8 | Sample 9 |
|---|---|---|---|
| Primary pipe member | Alloy T3 | Alloy T4 | Alloy T5 |
| Welding material | Alloy W5 | Alloy W3 | Alloy W4 |
| Buttering material | Alloy W5 | Alloy W3 | Alloy W4 |
| Solution heat treatment | 1,160° C. × 2 h | 1,000° C. × 2 h | |
| Pre-aging heat treatment | 900° C. × 16 h | | |
| Weld cracking | Absent | Absent | Absent |
| Creep tolerable temperature | 805° C. | 802° C. | 800° C. |

The results of the microstructure observation are shown in FIGS. 2 and 3. FIG. 2 is a schematic view showing microstructures of weld joints of Samples 1 to 6. FIG. 3 is a schematic view showing microstructures of weld joints of Samples 7 to 9. These results are explained below with reference to Tables 3 and 4, and FIGS. 2 and 3.

The weld joints of Samples 1 and 2 were obtained from the conventional Ni-based alloys after the pre-aging heat treatment (800° C.×16 hours) performed before welding. Buttering was not performed. The γ' phase already precipitated in the unwelded samples (labeled as "before welding"), and the same structure was observed also in samples examined immediately after the welding (labeled as "as-welded"), and in the creep test suspended specimens (labeled as "during creep test"). Weld cracking was also observed. The creep tolerable temperature was in the vicinity of 730° C. (Sample 1: 733° C.; Sample 2: 728° C.), unsuited for the high-temperature piping product of the 800° C. class.

The weld joints of Samples 3 and 4 were obtained from the conventional Ni-based alloys without performing the pre-aging heat treatment before welding (only the solution heat treatment was performed). Buttering was not performed. The γ' phase did not precipitate in the unwelded samples (before welding) and in samples examined immediately after the welding (as-welded), whereas γ'-phase precipitation was observed in the creep test suspended specimens (during creep test). There was no weld cracking. The creep tolerable temperature was in the vicinity of 740° C. (Sample 3: 742° C.; Sample 4: 738° C.), unsuited for the high-temperature piping product of the 800° C. class.

The weld joints of Samples 5 and 6 were obtained from the Ni-based alloys according to the present invention without performing the pre-aging heat treatment before welding (only the solution heat treatment was performed). Buttering was not performed. The γ' phase did not precipitate in the unwelded samples (before welding) and in samples examined immediately after the welding (as-welded), whereas coarse γ'-phase precipitation of an abnormal (amoeba-like) shape was observed in the creep test suspended specimens (during creep test). This is considered to be due to the compositions of the Ni-based alloys of the present invention that generate more γ'-phase precipitation than the conventional compositions, causing the γ' phase to precipitate at once at the creep test temperature (corresponds to the actual operating temperature), and resulting in abnormal grain growth. There was no weld cracking. The creep tolerable temperature was in the vicinity of 770° C. (Sample 5: 770° C.; Sample 6: 772° C.), unsuited for the high-temperature piping product of the 800° C. class. This is probably because of the lack of fine γ' phase dispersion and precipitation (the γ' phase underwent abnormal grain growth).

The weld joints of Samples 7 to 9 were obtained from the Ni-based alloys according to the present invention after the pre-aging heat treatment (900° C.×16 hours) performed before welding. Buttering was performed. The γ' phase did not precipitate in the primary pipe members and the welding material in samples examined immediately after the buttering (labeled as "as-buttered"), and about 10-volume % γ'-phase precipitation was observed after the pre-aging heat treatment only in the primary pipe members (labeled as "as-pre-aging heat treated"). In the creep test suspended specimens (labeled as "during creep test"), fine γ' phase dispersion and precipitation was observed in 30 volume % or more in the primary pipe members, and in 20 volume % or more in the welding material. There was no weld cracking. The creep tolerable temperature was 800° C. or more (Sample 7: 805° C.; Sample 8: 802° C.; Sample 9: 800° C.), confirming that the products are sufficiently applicable to the high-temperature piping product of the 800° C. class.

As demonstrated above, it was confirmed to provide the high-temperature piping product exhibiting a tolerable temperature of the 800° C. class, and the method for producing such high-temperature piping products. With the high-temperature piping product of the present invention, a boiler for power plants of the 800° C. class can be provided. This greatly contributes to improving the power generating efficiency of power plants.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A high-temperature piping product for flowing a high-temperature fluid, configured from a plurality of primary pipe members and a welding material,
   wherein the primary pipe members are each made from an Ni-based forged alloy which contains Ni, Al, and at least one of Mo and W, the total content of the Mo and the W being 3 mass % or more and 8 mass % or less, and the Ni-based forged alloy having a γ' phase precipitated therein in 30 volume % or more in which the precipitated γ' phase has a γ'-phase dissolution temperature of from 920 to 970° C. and a precipitation characteristic of 30 volume % or more in a temperature range of from 700 to 800° C.,
   wherein the welding material is made from an Ni-based cast alloy having a cast structure formed by welding, the Ni-based cast alloy containing Ni, Al, and at least one of Mo and W, the total content of the Mo and the W being 9 mass % or more and 15 mass % or less, and the Ni-based cast alloy having another γ' phase precipitated therein in 20 volume % or more in which the another precipitated γ' phase has a γ'-phase dissolution temperature of from 850 to 900° C. and a precipitation characteristic of 20 volume % or more in a temperature range of from 700 and 800° C., and wherein the welding material is buttered to the primary pipe members in portions welded to each other.

2. A boiler for power plants, the boiler comprising the high-temperature piping product according to claim 1.

3. The high-temperature piping product according to claim 1, wherein the Ni-based forged alloy contains: Al of 3.5 mass % or more and 4.5 mass % or less; Cr of 15 mass % or more and 20 mass % or less; Co of 25 mass % or less; C of 0.01 mass % or more and 0.15 mass % or less; at least one of Mo and W in a total content of 3 mass % to 8 mass %; and Ni and unavoidable impurities accounting for the remainder, and wherein the Ni-based cast alloy contains: Al of 3 mass % or more and 3.5 mass % or less; Cr of 15 mass % or more and 20 mass % or less; Co of 25 mass % or less; C of 0.01 mass % or more and 0.15 mass % or less; at least one of Mo and W in a total content of 9 mass % to 15 mass %; and Ni and unavoidable impurities accounting for the remainder.

4. A boiler for power plants, the boiler comprising the high-temperature piping product according to claim 3.

5. A method for producing the high-temperature piping product according to claim 1, the method comprising:

a secondary pipe member forming step of welding the primary pipe members to each other with the welding material buttered to welding portions of the primary pipe members and forming secondary pipe members each constructed from the plurality of primary pipe members; and a high-temperature piping product forming step of welding the secondary pipe members to each other with the welding material buttered to welding portions of the secondary pipe members and forming a high-temperature piping product.

6. The method according to claim 5, further comprising a pre-aging heat treatment step of subjecting the secondary pipe members to a heat treatment at a temperature equal to or greater than the γ'-phase dissolution temperature of the Ni-based cast alloy and at a temperature equal to or less than the γ'-phase dissolution temperature of the Ni-based forged alloy to precipitate 5 volume % or more and 15 volume % or less of the γ' phase in the primary pipe members, the pre-aging heat treatment step being performed after the secondary pipe member forming step and before the high-temperature piping product forming step.

7. A method for producing the high-temperature piping product according to claim 3, the method comprising:

a secondary pipe member forming step of welding the primary pipe members to each other with the welding material buttered to welding portions of the primary pipe members and forming secondary pipe members each constructed from the plurality of primary pipe members; and a high-temperature piping product forming step of welding the secondary pipe members to each other with the welding material buttered to welding portions of the secondary pipe members and forming a high-temperature piping product.

8. The method according to claim 7, further comprising a pre-aging heat treatment step of subjecting the secondary pipe members to a heat treatment at a temperature equal to or greater than a γ'-phase dissolution temperature of the Ni-based cast alloy and at a temperature equal to or less than a γ'-phase dissolution temperature of the Ni-based forged alloy to precipitate 5 volume % or more and 15 volume % or less of the γ' phase in the primary pipe members, the pre-aging heat treatment step being performed after the secondary pipe member forming step and before the high-temperature piping product forming step.

* * * * *